US011359954B2

(12) United States Patent
Ku (10) Patent No.: US 11,359,954 B2
(45) Date of Patent: Jun. 14, 2022

(54) ULTRASONIC DETECTOR AND DETECTION DEVICE (71) Applicant: DONGGUAN ZHENGYANG ELECTRONIC MECHANICAL CO., LTD., Guangdong (CN)

(72) Inventor: Yi-Hsin Ku, Dongguan (CN)

(73) Assignee: Dongguan Zhengyang Electronic Mechanical Co. Ltd., Dongguan (CN)

(*) Notice: Subject to any disclaimer, the term of this patent is extended or adjusted under 35 U.S.C. 154(b) by 8 days.

(21) Appl. No.: 16/769,022

(22) PCT Filed: Apr. 9, 2018

(86) PCT No.: PCT/CN2018/082266
§ 371 (c)(1),
(2) Date: Jun. 2, 2020

(87) PCT Pub. No.: WO2019/127972
PCT Pub. Date: Jul. 4, 2019

(65) Prior Publication Data
US 2021/0255024 A1  Aug. 19, 2021

(30) Foreign Application Priority Data
Dec. 26, 2017 (CN) .......................... 201711434072.7

(51) Int. Cl.
G01F 23/296 (2022.01)
(52) U.S. Cl.
CPC .................. G01F 23/296 (2013.01)
(58) Field of Classification Search
CPC ... G01F 23/296; G01F 23/2962; G01N 29/14; G01N 29/02; G01N 29/00; G01N 29/34; G01N 29/36; G01N 29/44; G01N 22/00

USPC ....................................................... 73/290 V
See application file for complete search history.

(56) References Cited

U.S. PATENT DOCUMENTS 4,958,518 A * 9/1990 Duenstl ............... G01F 23/2961
340/621
5,456,108 A   10/1995 Birkett
5,856,953 A   1/1999 Durkee
(Continued)

FOREIGN PATENT DOCUMENTS

CN   1062416   7/1992
CN   1092862   9/1994
(Continued)

OTHER PUBLICATIONS

International Search Report issued in PCT/CN2018/082266 dated Sep. 27, 2018.
(Continued)

Primary Examiner — Tarun Sinha
(74) Attorney, Agent, or Firm — Workman Nydegger (57) ABSTRACT Provided is an ultrasonic detector, including a detection area and a cover body. The cover body comprises at least two cavities, multiple fluid inlets and multiple fluid outlets which are in communication in sequence from inside to outside. The multiple fluid inlets, the multiple fluid outlets and the cavities are in fluid communication to form a fluid channel. The fluid channel is configured to guide fluid to flow along at least one bent path, and the detection area is located in an innermost one of the cavities.

20 Claims, 5 Drawing Sheets (56) References Cited

U.S. PATENT DOCUMENTS

| | | | |
|---|---|---|---|
| 2009/0301187 A1* | 12/2009 | Beyer | G01F 23/296 73/290 V |
| 2015/0096385 A1* | 4/2015 | Downie | G01F 15/08 73/861.04 |
| 2015/0337708 A1 | 11/2015 | Schlenke et al. | |
| 2015/0377684 A1 | 12/2015 | Strackerjan et al. | |

FOREIGN PATENT DOCUMENTS

| | | |
|---|---|---|
| CN | 2206449 | 8/1995 |
| CN | 101490515 | 7/2009 |
| CN | 201653498 | 11/2010 |
| CN | 102192771 | 9/2011 |
| CN | 105222860 | 1/2016 |
| CN | 106596717 | 4/2017 |
| EP | 0479434 | 4/1992 |
| JP | 2009544045 | 12/2009 |
| JP | 2017526897 | 9/2017 |

OTHER PUBLICATIONS

European Search Report cited in Application No. 18897593.2-1001 / 3734239 PCT/CN2018082266, dated Jul. 22, 2021.

* cited by examiner

ULTRASONIC DETECTOR AND DETECTION DEVICE

CROSS-REFERENCES TO RELATED APPLICATIONS

This disclosure claims priority to Chinese patent application No. 201711434072.7 filed on Dec. 26, 2017, application of which is incorporated herein by reference in its entirety.

TECHNICAL FIELD

The present disclosure relates to the technical field of fluid detection, for example, an ultrasonic liquid level detector and a detection device using the ultrasonic liquid level detector.

BACKGROUND

In modern industrial production, the concentration of the liquid in the container often needs to be measured. Due to the advantages such as high accuracy, small size, reliable signal processing, ultrasonic detectors are widely used.

Detection areas of the ultrasonic detectors on the market are detected by adopting direct exposure or mesh protection. When the direct exposure is adopted, the ultrasonic signal processing is affected by the foreign objects and the air bubbles generated by the solution vibration caused by sloshing of the ultrasonic detection area when the added solution is injected and when the vehicle is running, resulting in an inaccurate measured value. When the mesh protection is adopted, the protection effect is poor in a case where the mesh hole is too large; and the air bubbles at a sound source detecting position cannot be completely discharged in a case where the mesh hole is too small, which affects the detection of the ultrasonic on the solution.

SUMMARY

The following is a summary of subject matter that is described in detail herein, and the summary is not intended to limit the protection scope of the claims.

The present disclosure provides an ultrasonic detector to solve the technical problem in the related art that the ultrasonic detector is easily interfered by the air bubbles and the foreign objects.

The present disclosure further provides a detection device to solve the technical problem in the related art that the ultrasonic detection device is easily interfered by the air bubbles and the foreign objects.

Provided is an ultrasonic detector, including a detection area and a cover body. The cover body includes at least two cavities, multiple fluid inlets and multiple fluid outlets which are communicated in sequence from inside to outside. The multiple fluid inlets, the multiple fluid outlets and the at least two cavities are in fluid communication to form a fluid channel. The fluid channel is configured to guide fluid to flow along at least one bent path, and the detection area is located in an innermost one of the at least two cavities.

In an embodiment, the at least two cavities include an inner cavity and an outer cavity, a fluid inlet of the outer cavity is smaller than a fluid inlet of the inner cavity, so that the fluid in the outer cavity merges at the fluid inlet of the inner cavity.

In an embodiment, the at least two cavities include an inner cavity and an outer cavity, a fluid inlet of the inner cavity is smaller than a fluid inlet of the outer cavity, so that the fluid in the outer cavity is diverted to flow into the inner cavity.

In an embodiment, the at least two cavities include an inner cavity and an outer cavity, a fluid inlet of the inner cavity and a fluid inlet of the outer cavity are misaligned, and a fluid outlet of the inner cavity and a fluid outlet of the outer cavity are misaligned.

In an embodiment, the fluid inlet of the inner cavity and the fluid outlet of the inner cavity are misaligned, and the fluid inlet of the outer cavity and the fluid outlet of the outer cavity are misaligned.

In an embodiment, the fluid outlet of the inner cavity is smaller than the fluid inlet of the inner cavity, so that the fluid in the inner cavity is diverted at the fluid outlet of the inner cavity.

In an embodiment, the fluid outlet of the inner cavity is larger than the fluid inlet of the inner cavity, so that the fluid in the inner cavity merges at the fluid outlet of the inner cavity.

In an embodiment, the cover body includes an inner case and an outer case sleeved outside the inner case, the inner cavity is formed inside the inner case, and the outer cavity is formed between the inner case and the outer case.

In an embodiment, a first side of the inner cavity is provided with a first hole disposed on the inner case and a second hole disposed on the outer case; and a second side of the inner cavity is provided with a third hole disposed on the inner case and a fourth hole disposed on the outer case.

In an embodiment, at least two first holes and at least two third holes are provided, and one second hole and one fourth hole are provided.

In an embodiment, the second hole side of the outer case is provided with a fifth hole, the fifth hole and the second hole are convective, and the fifth hole and the first hole are misaligned.

Provided is a detection device, including an ultrasonic detector according to any one of the above.

In an embodiment, the detection device further includes a control box, a liquid level detection pipe, a fluid pipe and a flange. The fluid pipe is configured for transporting fluid. The liquid level detection pipe is configured to detect a liquid level of the fluid in a tank. The flange is configured to seal the fluid in the tank. The control box is configured to provide electric connection of the liquid level detection pipe and an external electronic device, and electric connection of the ultrasonic detector and the external electronic device.

In an embodiment, the detection device further includes a heater circuit. The heater circuit is configured to heat the fluid to prevent the fluid from being solidified.

The ultrasonic detector provided by the present disclosure effectively prevents air bubbles and foreign objects in the fluid from entering the detection area, thereby weakening the interference of other sound sources on the signal detection and improving the stability of the ultrasonic detector.

Upon reviewing and understanding the drawings and detailed description, other aspects can be understood.

In the drawings:
1—ultrasonic detector; 2—control box; 3—heater circuit; 4—liquid level detection pipe; 5—urea pipe; 6—tank; 7—flange;
11—detection area;
12—inner case; 121—first hole; 122—third hole; 123—ultrasonic reflecting surface; 124—ultrasonic transmitting-receiving surface;
13—outer case; 131—second hole; 132—fourth hole; 133—fifth hole;
14—inner cavity; 15—outer cavity.

DETAILED DESCRIPTION

Embodiment I

Figure 1:
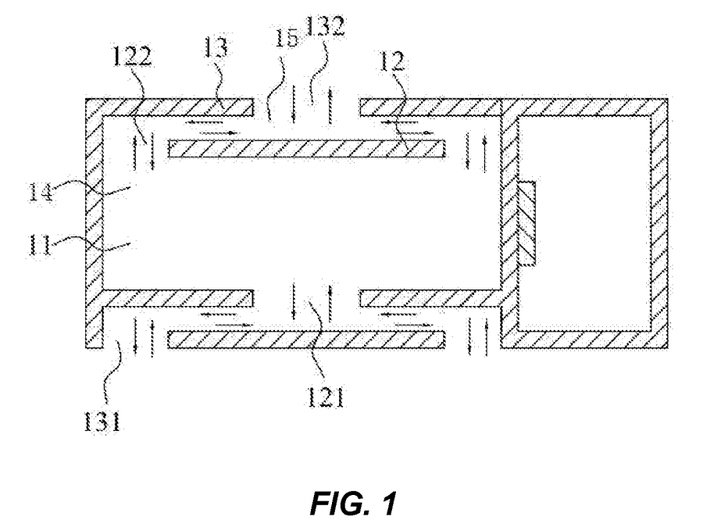
FIG. 1 is a sectional view illustrating an ultrasonic detector provided by embodiment I.
Figure 2:
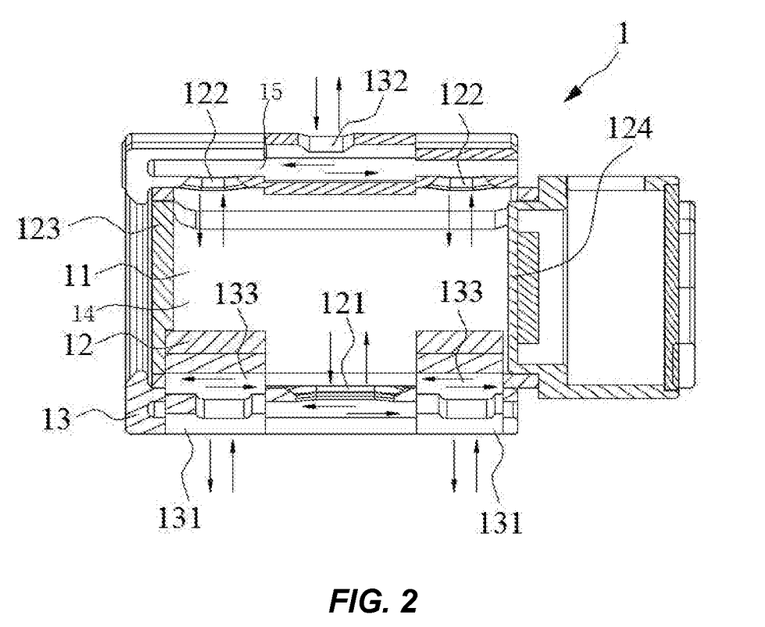
FIG. 2 is a structural sectional view illustrating the ultrasonic detector provided by embodiment I.
Figure 3:
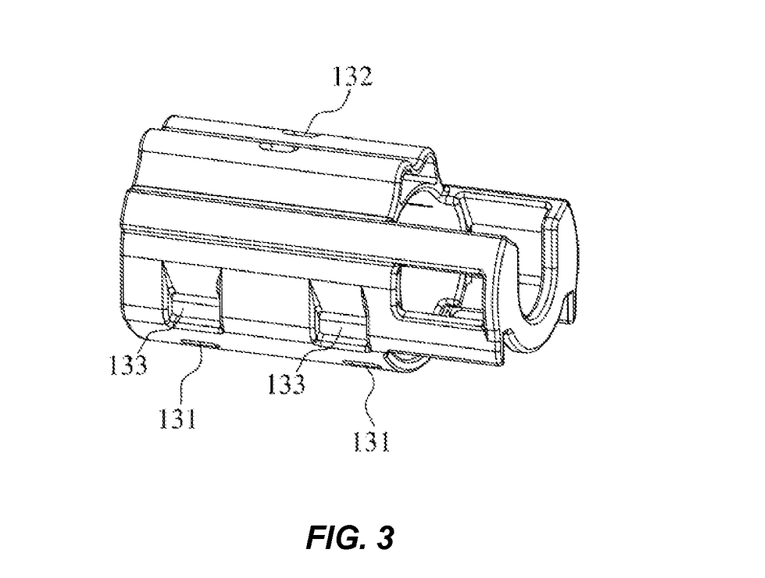
FIG. 3 is a structural schematic diagram illustrating the ultrasonic detector provided by embodiment I.

As shown in FIG. 1 to FIG. 3, the present embodiment provides an ultrasonic detector 1, including a detection area 11 and a cover body. The ultrasonic detector 1 may be used for detecting various fluids, such as gasoline, diesel, hydraulic fluid, transmission fluid, urea solution and the like; and may also be used in combination with other components. A detection element for detecting fluid characteristics of the detection area 11 may be located in the detection area 11, and may also be separated from the detection area 11 via a partition.

The cover body includes at least two cavities, multiple fluid inlets, and multiple fluid outlets which are communicated in sequence from inside to outside. The fluid inlets, the fluid outlets and the at least two cavities are in fluid communication to form a fluid channel. The fluid channel guides the fluid to flow along at least one bent path. The detection area is located in the innermost cavity. The fluid flowing path is bent, which can prevent air bubbles and foreign objects in the fluid from entering the detection area 11, thereby weakening the interference of other sound sources on the signal detection and improving the stability of the ultrasonic detector 1.

The cover body includes an inner cavity and an outer cavity. The bent fluid channel is formed between a fluid inlet of the outer cavity, a fluid inlet of the inner cavity, a fluid outlet of the inner cavity and a fluid outlet of the outer cavity. The fluid flowing path is narrow and circuitous. The air bubbles in the fluid, due to a light mass thereof, flow upward along the outer cavity, which reduces the amount of the air flowing into the inner cavity. In an example, the cover body may include the inner cavity, the outer cavity and a third cavity which are communicated in sequence from the inside to the outside, and the fluid flowing principle in this example is the same as stated above, which is described herein. Multiple fluid inlets and multiple fluid outlets may be provided.

In the present embodiment, the fluid inlet of the outer cavity is smaller than the fluid inlet of the inner cavity. The fluid in the outer cavity merges at the fluid inlet of the inner cavity, so that the fluid flowing path is bent; in other words, the external fluid is diverted into the outer cavity through the fluid inlet of the outer cavity and merges at the fluid inlet of the inner cavity.

In the present embodiment, the fluid inlet may be used for the fluid flowing in, and the fluid outlet may be used for the fluid flowing out. When the cover body is placed in a different position, the fluid inlet may also be used for the fluid flowing out, and the fluid outlet may also be used for the fluid flowing in, namely, both the fluid inlet and the fluid outlet are used for the fluid flowing through.

In view of the interchangeability of the fluid inlet and the fluid outlet, the cover body may be symmetrically disposed along an axis; namely, after the fluid merges at the fluid inlet of the inner cavity and enters the inner cavity, the fluid merges again and flows out from another side of inner cavity, and then is diverted to flow out of the outer cavity. The cover body may also be not symmetrically disposed along the axis; after the fluid merges at the fluid inlet of the inner cavity and enters the inner cavity, the fluid is diverted to flow out from another side of the inner cavity.

In the present embodiment, the fluid outlet of the inner cavity is smaller than the fluid inlet of the inner cavity. The fluid in the inner cavity is diverted at the fluid outlet of the inner cavity, so that the fluid flowing path is bent, thereby reducing the fluid fluctuation and facilitating the air discharge.

After the fluid flows out of the inner cavity, the fluid may be diverted and then flow out of the outer cavity, and may also merge and then flow out of the outer cavity.

In an example, the cover body includes an inner case 12 and an outer case 13 sleeved outside the inner case 12. An inner cavity 14 is formed inside the inner case 12, and an outer cavity 15 is formed between the inner case 12 and the outer case 13. The fluid flows in through the fluid inlet of the outer cavity 15; part of the fluid flows through the inner cavity 14 and then flows out through the fluid outlet of the outer cavity 15, the detection element in the inner cavity 14 detects the characteristics of the fluid; the other part of the fluid does not flow through the inner cavity 14 and directly flows out through the fluid outlet of the outer cavity 15. The fluid flowing path is narrow and circuitous. After flowing in through the fluid inlet of the outer cavity 15, the air bubbles in the fluid, due to a light mass thereof, flow upward along the outer cavity 15 and directly flow out through the fluid outlet of the outer cavity 15, which reduces the amount of the air flowing into the inner cavity 14 and weakens the interference of other sound sources on the signal detection.

One side of the inner cavity 14 is provided with a first hole 121 disposed on the inner case 12 and a second hole 131 disposed on the outer case 13; and another side of the inner cavity 14 is provided with a third hole 122 disposed on the inner case 12 and a fourth hole 132 disposed on the outer case 13. One or more first holes 121, one or more second holes 131, one or more third holes 122 and one or more fourth holes 132 may be provided.

Both the inner case 12 and the outer case 13 are columnar pipe bodies. The first hole 121 is disposed on a surface of the inner case 12, and the third hole 122 is disposed on the surface of the inner case 12 and opposite to the first hole 121 along a radial direction of the pipe body. A first end surface of the inner case 12 is an ultrasonic reflecting surface 123, and a second end surface of the inner case 12 opposite to the first end surface is an ultrasonic transmitting-receiving surface 124. The end surface of the inner case 12 may be circular or oval. The inner case 12 and the outer case 13 may be cuboids or spheres, as long as the bent path when the fluid flows is satisfied.

When the axis of the cover body is horizontally disposed and the second hole 131 is located on a lower side of the cover body, a positon of the second hole 131 is lower than a position of the first hole 121, and a position of the fourth hole 132 is higher than a position of the third hole 122. When the fluid gradually increases from down to up, the fluid may flow along a first path as follows: the fluid flows into the outer cavity 15 through the second hole 131, one part of the fluid flows into the inner cavity 14 through the first hole 121, and flows out of the inner cavity 14 through the third hole 122 and then flows out of the outer cavity 15 through the fourth hole 132, the detection element in the inner cavity 14 detects the characteristics of the fluid; another part of the fluid flows into the outer cavity 15 through the second hole 131 and then flows out of the outer cavity 15 through the fourth hole 132. When the fluid flows into the outer cavity 15 through the second hole 131, the air bubbles in the fluid, due to a light mass thereof, flow upward along the outer cavity 15 and then directly flow out through the fourth hole 132. When the fluid is injected from up to down, the fluid may also flow along a second path which is opposite to the first path, the air, due to a light mass thereof, still remains flow upward. Since the ultrasonic detector 1 may further be used for detecting the concentration of the fluid, the ultrasonic detector 1 may be directly immersed in the fluid. When the fluid sloshes, the fluid may flows along a direction combining the first path and the second path, as shown by the arrows in FIG. 1.

With reference to FIG. 2 and FIG. 3, a fifth hole 133 is disposed on a side of the outer case 13 where the second hole 13 is located. The fifth hole 133 and the second hole 131 are convective, and the fifth hole 133 and the first hole 121 are misaligned. In the present embodiment, the fifth hole 133 and the second hole 131 are located at a same position along an axis direction of the pipe body. The fifth hole 133 and the second hole 131 are convective, and the fluid and the air bubbles may flow out through the fifth hole 133, thereby accelerating the replacement of the solution, quickly discharging the air bubbles and foreign objects from the bottom of the detector, quickly detecting the quality of the newly added solution, and improving the rate of the solution replacement in the detector.

When the axis of the cover body is horizontally disposed and the second hole 131 is located on the lower side of the cover body, a position of the fifth hole 133 is higher than a position of the first hole 121, thereby preventing the ultrasonic reflecting surface 123 and the ultrasonic transmitting-receiving surface 124 from being directly attached with the air bubbles when the air bubbles are injected to affect the ultrasonic signal processing.

In the present embodiment, one first hole 121 is provided. When the axis of the columnar pipe body is horizontally disposed, two fourth holes 132 are respectively disposed at the top and middle of the outer case 13. Two third holes 122 are provided. The two third holes 122 and a top of the inner case 12 are located in a same horizontal surface. One of the two third holes 122 is disposed adjacent to the first end surface of the inner case 12, and another of the two third holes 122 is disposed adjacent to the second end surface of the inner case 12, thereby avoid the injection of the air bubbles and the foreign objects in the added solution, improving the stability of the ultrasonic detector 1, weakening the interference of other sound sources on the signal detection. The two third holes 122 are located above the ultrasonic reflecting surface 123 and the ultrasonic transmitting-receiving surface 124, thereby quickly discharging the air bubbles generated from the ultrasonic reflecting surface 123 and the ultrasonic transmitting-receiving surface 124, and reducing the influences on the ultrasonic signal processing.

When the axis of the cover body is horizontally disposed and the second hole 131 is located on the lower side of the cover body, the first hole 121 is disposed on the bottom and middle of the inner case 12; four second holes 131 are located on a same horizontal surface and evenly distributed around the first hole 121, and four fifth holes 133 are located on a same horizontal surface and evenly distributed around the first hole 121; the positions of the fifth holes 133 are higher than the position of the first hole 121, and the positions of the second holes 131 are lower than the position of the first hole 121, namely, the positions of the second holes 131 are lower than a ultrasonic signal processing position, i.e., the positions of the ultrasonic reflecting surface 123 and the ultrasonic transmitting-receiving surface 124, thereby realizing quick discharge of the solution on the ultrasonic signal processing position when the liquid level is low.

The cover body may be made of plastic or metal, in order to reduce costs, for example, made of rubber.

Embodiment II

Figure 4:
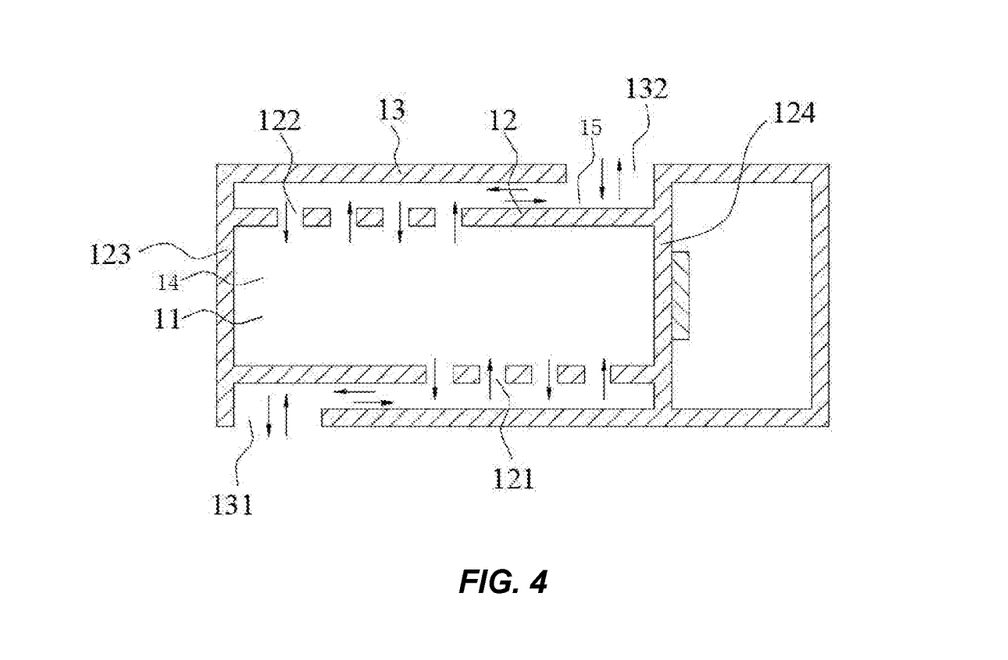
FIG. 4 is a sectional view illustrating an ultrasonic detector provided by embodiment II.

FIG. 4 shows embodiment II, in which the components same as or corresponding to those in embodiment I adopt the same reference numerals corresponding to embodiment I. For simplicity, only differences between embodiment II and embodiment I will be described, and the differences are described as follows: the fluid inlet of the inner cavity is smaller than the fluid inlet of the outer cavity, and the fluid in the outer cavity is diverted into the inner cavity, namely, the external fluid merges into the outer cavity through the fluid inlet of the outer cavity and is diverted at the fluid inlet of the inner cavity. The fluid inlet and the fluid outlet are interchangeable.

In view of the interchangeability of the fluid inlet and the fluid outlet, the cover body may be symmetrically disposed along the axis; namely, after the fluid is diverted into the inner cavity through the fluid inlet on a first side of the inner cavity, the fluid is diverted again to flow out from a second side of the inner cavity, and then merges to flow out of the outer cavity.

In one example, the cover body may be not symmetrically disposed along the axis. After the fluid is diverted into the inner cavity through the fluid inlet on the first side of the inner cavity, the fluid merges to flow out through the second side of the inner cavity; namely, the fluid outlet of the inner cavity is larger than the fluid inlet of the inner cavity, the fluid in the inner cavity merges at the fluid outlet of the inner cavity, so that the fluid flowing path is bent, thereby reducing the fluid fluctuation and facilitating the air discharge.

After the fluid flows out of the inner cavity, the fluid may be diverted and then flow out of the outer cavity, and may also merge and then flow out of the outer cavity.

In the present embodiment, at least two first holes 121 and at least two third holes 122 are provided, and one second hole 131 and one fourth hole 132 are provided. The first holes 121 are distributed at intervals on the inner case 12 along a direction facing away from the ultrasonic transmitting-receiving surface 124, and the second hole 131 is disposed on the outer case 13 adjacent to the ultrasonic reflecting surface 123. The third holes 122 are distributed at intervals on the inner case 12 along a direction facing away from the ultrasonic reflecting surface 123, and the fourth hole 132 is disposed on the outer case 13 adjacent to the ultrasonic transmitting-receiving surface 124.

An aperture of each first hole 121 is smaller than an aperture of the second hole 131, and an aperture of each third hole 122 is smaller than an aperture of the fourth hole 132. Therefore, the diversion is realized when the fluid flows into the inner cavity 14 from the outer cavity 15 and when fluid flows out of the inner cavity 14. Through the diversion, the fluid fluctuation reduced, the flowing stability of the liquid in the ultrasonic zone is realized, and the stable detection of the ultrasonic signal is also realized.

Embodiment III

Figure 5:
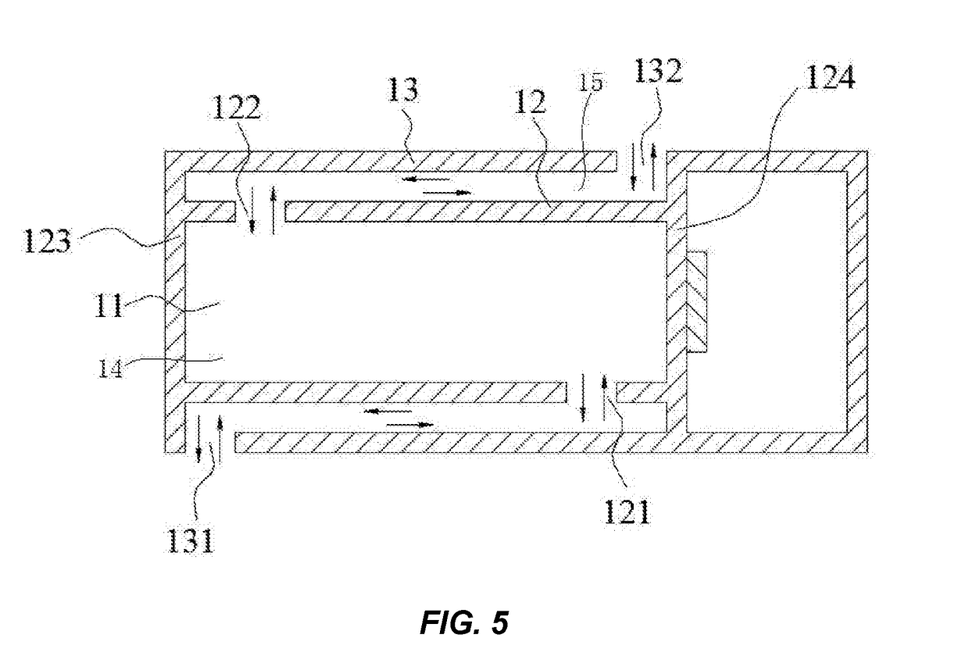
FIG. 5 is a sectional view illustrating an ultrasonic detector provided by embodiment III.

FIG. 5 shows embodiment III, in which the components same as or corresponding to those in embodiment I adopt the same reference numerals corresponding to embodiment I. For simplicity, only differences between embodiment III and embodiment I will be described, and the differences are described as follows: the fluid inlet of the inner cavity and the fluid inlet of the outer cavity are misaligned, and the fluid outlet of the inner cavity and the fluid outlet of the outer cavity are misaligned, which enhances the bending of the fluid flowing path, extends the buffer time and facilitates the air discharge.

In some examples, the fluid may merge to enter the inner cavity, and may also be diverted to enter the inner cavity. After the fluid enters the inner cavity, the fluid may be diverted and then flow out, and may also merge and then flow out. After the fluid flows out of the inner cavity, the fluid may be diverted and then flow out of the outer cavity, and may also merge and then flow out of the outer cavity.

In the present embodiment, the first hole 121 and the second hole 131 are misaligned, and the third hole 122 and the fourth hole 132 are misaligned.

In order to extend the fluid flowing path, the fluid inlet and the fluid outlet of the respective cavity are misaligned, namely, the fluid inlet and the fluid outlet of the inner cavity 14 are misaligned, and the fluid inlet and the fluid outlet of the outer cavity 15 are misaligned.

In the present embodiment, the first hole 121 and the third hole 122 are misaligned, and the second hole 131 and the fourth hole 132 are misaligned. The first hole 121 is disposed on the inner case 12 and adjacent to the ultrasonic transmitting-receiving surface 124, and the second hole 131 is disposed on the outer case 13 adjacent to the ultrasonic reflecting surface 123, making the distance between the first hole 121 and the second hole 131 as large as possible. Correspondingly, in order to realize the misalignment, the third hole 122 is disposed on the inner case 12 and adjacent to the ultrasonic reflecting surface 123, and the fourth hole 132 is disposed on the outer case 13 and adjacent to the ultrasonic transmitting-receiving surface 124. As shown by the directions of the arrows in FIG. 5, the liquid flowing direction adopts a S-shaped flowing direction design, to prevent the external liquid from forming a non-directional-opposite liquid together with the liquid at the ultrasonic signal position, and to realize the stable detection of the ultrasonic signal.

Embodiment IV

Figure 6:
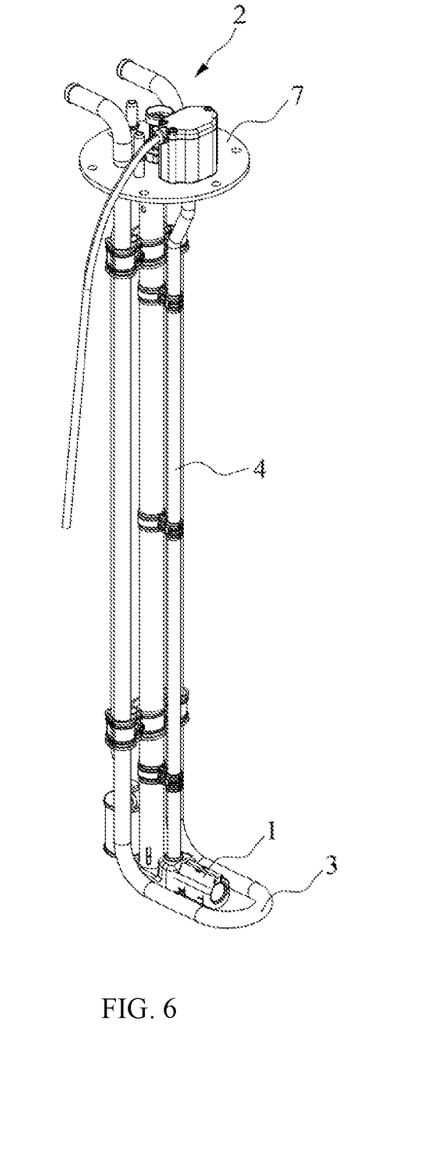
FIG. 6 is a structural schematic diagram illustrating a detection device provided by embodiment IV.
Figure 7:
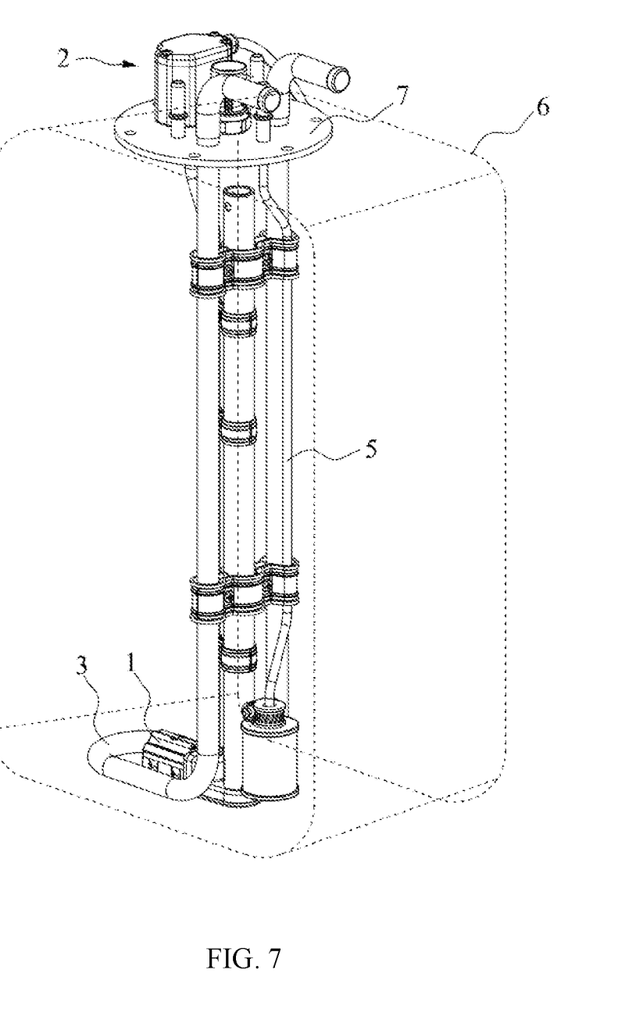
FIG. 7 is a structural schematic diagram illustrating the detection device in use provided by embodiment IV.

With reference to FIG. 6 and FIG. 7, the present embodiment further provides a detection device, including the ultrasonic detector 1 of any one of the above-described embodiments. When detecting some specific fluids, such as urea solution or liquid urea, the detection device may be provided with a heater. In one example, the detection device further includes a control box 2, a heater circuit 3, a liquid level detection pipe 4, a fluid pipe 5 and a flange 7. The liquid level detection pipe 4 is configured to detect a liquid level of the fluid in a tank 6. The flange 7 is configured to seal the fluid in the tank 6. In actual use, the heater circuit 3 may heat the fluid such as the urea solution to prevent the fluid from being solidified. The fluid pipe 5 may realize the transportation of the fluid such as the urea solution. The control box 2 is configured to provide electric connections of the liquid level detection pipe 4 and electronic device such as an external computer, and electric connections of the ultrasonic detector 1 and the electronic device such as the external computer.

INDUSTRIAL APPLICABILITY

The ultrasonic detector provided by the present disclosure effectively prevents air bubbles and foreign objects in the fluid from entering the detection area, thereby weakening the interference of other sound sources on the signal detection and improving the stability of the ultrasonic detector.

What is claimed is:

1. An ultrasonic detector, comprising:
a detection area; and
a cover body, comprising at least two cavities, a plurality of fluid inlets and a plurality of fluid outlets which are communicated in sequence from inside to outside, wherein each of the plurality of fluid inlets and each of the plurality of fluid outlets are configured to allow fluid to flow into and flow out of a respective one of the at least two cavities;
wherein, the plurality of fluid inlets, the plurality of fluid outlets and the at least two cavities are in fluid communication to form a fluid channel, the fluid channel is configured to guide the fluid to flow along at least one bent path, and the detection area is located in an innermost one of the at least two cavities,
each of the at least two cavities is provided with a fluid inlet and a fluid outlet, so that when the fluid flows into the outermost one of the at least two cavities from the fluid inlet of the outermost one of the at least two cavities, part of the fluid can flow into the detection area and part of the fluid can carry air bubbles in the fluid to flow only along the outermost one of the at least two cavities and then be discharged from the fluid outlet of the outermost one of the at least two cavities so as to prevent the air bubbles in the fluid from entering the detection area, and
the each of the plurality of fluid inlets is located on a bottom surface of the respective one of the at least two cavities, the each of the plurality of fluid outlets is located on an upper surface of the respective one of the at least two cavities, the fluid inlet of the outermost one of the at least two cavities is lower than the fluid inlet of the innermost one of the at least two cavities, and the fluid outlet of the innermost one of the at least two cavities is lower than the fluid outlet of the outermost one of the at least two cavities.

2. The ultrasonic detector according to claim 1, wherein the at least two cavities comprise an inner cavity and an outer cavity, a fluid inlet of the outer cavity is smaller than a fluid inlet of the inner cavity, so that the fluid in the outer cavity merges at the fluid inlet of the inner cavity.

3. The ultrasonic detector according to claim 1, wherein the at least two cavities comprise an inner cavity and an outer cavity, a fluid inlet of the inner cavity is smaller than a fluid inlet of the outer cavity, so that the fluid in the outer cavity is diverted to flow into the inner cavity.

4. The ultrasonic detector according to claim 1, wherein the at least two cavities comprise an inner cavity and an outer cavity, a fluid inlet of the inner cavity and a fluid inlet of the outer cavity are misaligned, and a fluid outlet of the inner cavity and a fluid outlet of the outer cavity are misaligned.

5. The ultrasonic detector according to claim 4, wherein the fluid inlet of the inner cavity and the fluid outlet of the inner cavity are misaligned, and the fluid inlet of the outer cavity and the fluid outlet of the outer cavity are misaligned.

6. The ultrasonic detector according to claim 2, wherein the fluid outlet of the inner cavity is smaller than the fluid inlet of the inner cavity, so that the fluid in the inner cavity is diverted at the fluid outlet of the inner cavity.

7. The ultrasonic detector according to claim 3, wherein the fluid outlet of the inner cavity is larger than the fluid inlet of the inner cavity, so that the fluid in the inner cavity merges at the fluid outlet of the inner cavity.

8. The ultrasonic detector according to claim 2, wherein the cover body comprises an inner case and an outer case sleeved outside the inner case, the inner cavity is formed inside the inner case, and the outer cavity is formed between the inner case and the outer case.

9. The ultrasonic detector according to claim 8, wherein a first side of the inner cavity is provided with a first hole disposed on the inner case and a second hole disposed on the outer case; and a second side of the inner cavity is provided with a third hole disposed on the inner case and a fourth hole disposed on the outer case.

10. The ultrasonic detector according to claim 9, wherein at least two first holes and at least two third holes are provided, and one second hole and one fourth hole are provided.

11. The ultrasonic detector according to claim 9, wherein a first side of the outer case is provided with a fifth hole, the fifth hole and the second hole are convective, and the fifth hole and the first hole are misaligned.

12. A detection device, comprising an ultrasonic detector, the ultrasonic detector comprising:
a detection area; and
a cover body, comprising at least two cavities, a plurality of fluid inlets and a plurality of fluid outlets which are communicated in sequence from inside to outside, wherein each of the plurality of fluid inlets and each of the plurality of fluid outlets are configured to allow fluid to flow into and flow out of a respective one of the at least two cavities;
wherein, the plurality of fluid inlets, the plurality of fluid outlets and the at least two cavities are in fluid communication to form a fluid channel, the fluid channel is configured to guide the fluid to flow along at least one bent path, and the detection area is located in an innermost one of the at least two cavities,
each of the at least two cavities is provided with a fluid inlet and a fluid outlet, so that when the fluid flows into the outermost one of the at least two cavities from the fluid inlet of the outermost one of the at least two cavities, part of the fluid can flow into the detection area and part of the fluid can carry air bubbles in the fluid to flow only along the outermost one of the at least two cavities and then be discharged from the fluid outlet of the outermost one of the at least two cavities so as to prevent the air bubbles in the fluid from entering the detection area, and
the each of the plurality of fluid inlets is located on a bottom surface of the respective one of the at least two cavities, the each of the plurality of fluid outlets is located on an upper surface of the respective one of the at least two cavities, the fluid inlet of the outermost one of the at least two cavities is lower than the fluid inlet of the innermost one of the at least two cavities, and the fluid outlet of the innermost one of the at least two cavities is lower than the fluid outlet of the outermost one of the at least two cavities.

13. The detection device according to claim 12, further comprising a control box, a liquid level detection pipe, a fluid pipe and a flange, wherein
the fluid pipe is configured for transporting fluid;
the liquid level detection pipe is configured to detect a liquid level of fluid in a tank;
the flange is configured to seal the fluid in the tank; and
the control box is configured to provide electric connection of the liquid level detection pipe and an external electronic device, and electric connection of the ultrasonic detector and the external electronic device.

14. The detection device according to claim 13, further comprising a heater circuit, wherein the heater circuit is configured to heat the fluid to prevent the fluid from being solidified.

15. The detection device according to claim 12, wherein the at least two cavities comprise an inner cavity and an outer cavity, a fluid inlet of the outer cavity is smaller than a fluid inlet of the inner cavity, so that the fluid in the outer cavity merges at the fluid inlet of the inner cavity.

16. The detection device according to claim 12, wherein the at least two cavities comprise an inner cavity and an outer cavity, a fluid inlet of the inner cavity is smaller than a fluid inlet of the outer cavity, so that the fluid in the outer cavity is diverted to flow into the inner cavity.

17. The detection device according to claim 12, wherein the at least two cavities comprise an inner cavity and an outer cavity, a fluid inlet of the inner cavity and a fluid inlet of the outer cavity are misaligned, and a fluid outlet of the inner cavity and a fluid outlet of the outer cavity are misaligned.

18. The ultrasonic detector according to claim 4, wherein the fluid outlet of the inner cavity is smaller than the fluid inlet of the inner cavity, so that the fluid in the inner cavity is diverted at the fluid outlet of the inner cavity.

19. The ultrasonic detector according to claim 4, wherein the fluid outlet of the inner cavity is larger than the fluid inlet of the inner cavity, so that the fluid in the inner cavity merges at the fluid outlet of the inner cavity.

20. The ultrasonic detector according to claim 3, wherein the cover body comprises an inner case and an outer case sleeved outside the inner case, the inner cavity is formed inside the inner case, and the outer cavity is formed between the inner case and the outer case.

* * * * *